United States Patent [19]
Zimmermann et al.

[11] Patent Number: 5,952,917
[45] Date of Patent: Sep. 14, 1999

[54] TAILLIGHT FIXTURE OF A VEHICLE PREFERABLY A MOTOR VEHICLE

[75] Inventors: Werner Zimmermann, Ottenbach; Djuanarto Kusuma, Rödental; Helmut Haf, Schwaikheim; Winfried Gauch, Magstadt, all of Germany

[73] Assignee: Reitter & Schefenacker GmbH & Co. KG, Esslingen, Germany

[21] Appl. No.: 08/844,709

[22] Filed: Apr. 18, 1997

[30] Foreign Application Priority Data

Apr. 20, 1996 [DE] Germany .......................... 196 15 808

[51] Int. Cl.[6] ...................................... B60Q 1/26
[52] U.S. Cl. .......................... 340/469; 340/468; 340/458; 307/10.8
[58] Field of Search .................... 340/458, 459, 340/460, 461, 462, 438, 602, 468, 469, 475, 478, 479; 250/222.1, 222.2; 307/10.8; 315/77, 82

[56] References Cited

U.S. PATENT DOCUMENTS

| | | | |
|---|---|---|---|
| 3,609,450 | 9/1971 | Hart | 315/82 |
| 3,828,220 | 8/1974 | Moore et al. | 315/82 |
| 4,224,551 | 9/1980 | Liebegott | 313/323 |
| 4,438,422 | 3/1984 | Nojiri et al. | 340/460 |
| 4,587,512 | 5/1986 | Casey | 340/457 |
| 4,971,405 | 11/1990 | Hwang | 315/77 |
| 5,212,468 | 5/1993 | Adell | 340/469 |
| 5,223,814 | 6/1993 | Suman | 340/461 |
| 5,229,602 | 7/1993 | Juliger | 340/602 |
| 5,231,373 | 7/1993 | Freeman et al. | 340/469 |
| 5,272,464 | 12/1993 | Jorgensen | 340/459 |
| 5,285,060 | 2/1994 | Larson et al. | 340/461 |
| 5,361,064 | 11/1994 | Hamer et al. | 340/939 |
| 5,455,488 | 10/1995 | Rhoades et al. | 315/156 |
| 5,666,028 | 9/1997 | Bechtel et al. | 315/82 |

Primary Examiner—Jeffery A. Hofsass
Assistant Examiner—Van T. Trieu
Attorney, Agent, or Firm—Robert W. Becker & Associates

[57] ABSTRACT

A taillight fixture for a motor vehicle has at least one light window and a light arrangement with lights, including a brake light, a turn signal light, and a taillight, arranged behind the light window. Light beams emitted by the light arrangement pass through the light window to the exterior. At least one first light-sensitive sensor is positioned in the area of the light window. A control device is provided and the at least one first sensor is connected thereto. At least one of the lights of the light arrangement is connected to the control device, and the control device controls the luminocity of at least one light based on signals received from the first sensor.

27 Claims, 7 Drawing Sheets

SIGNAL LEVEL AFTER RECTIFICATION

FIG. 6a

SIGNAL LEVER AFTER SMOOTHING

TAILLIGHT FIXTURE OF A VEHICLE PREFERABLY A MOTOR VEHICLE

BACKGROUND OF THE INVENTION

The invention relates to a taillight fixture of a vehicle, preferably a motor vehicle, including a brake light, a turn signal light, and a taillight arranged behind at least one light window through which the light beams emitted by the lights can exit to the exterior.

When driving in rain, snow, or other adverse weather conditions, the light window of the taillight fixture often becomes soiled. Then, the respective signal lights of the taillight fixture are detectable by following traffic participants only with difficulty. For this reason, it is known to embody the light window of the taillight fixture so as to be meander-shaped in cross-section. This measure supposedly prevents adhesion of dirt particles.

It is an object of the present invention to provide a taillight fixture of the aforementioned kind such that in a simple manner it is ensured that the beams emitted by the lights within the taillight fixture can be reliably detected by following traffic participants.

SUMMARY OF THE INVENTION

The taillight fixture for a motor vehicle according to the present invention is primarily characterized by:

At least one light window;

A light arrangement with lights including a brake light, a turn signal light, and a taillight arranged behind the at least one light window so that light beams emitted by the light arrangement pass through the at least one light window to the exterior;

At least one first light-sensitive sensor positioned in the area of the at least one light window;

A control device;

The at least one first sensor connected to the control device;

At least one of the lights of the light arrangement connected to the control device, wherein the control device controls luminosity of the at least one light based on signals received from the at least one first sensor.

Preferably, the at least one first sensor is positioned behind the at least one light window. However, the at least one first sensor may be part of the at least one light window.

The taillight fixture further comprises at least one current regulator connected between the control unit and the at least one light and connected to a power supply of the motor vehicle.

Preferably, the control device processes the signals received from the at least one first sensor to modulated control signals.

The control device may process the signals received from the at least one first sensor to current-controlled signals.

The taillight fixture may further comprise an analog/digital convertor, wherein the at least one first sensor is connected to the analog/digital convertor.

The analog/digital convertor is an SLIO controller.

The analog/digital convertor is connected to the control device.

Advantageously, the taillight fixture further comprises a rectifier connected to the at least one first sensor and the analog/digital convertor.

The rectifier is a synchronizing rectifier.

The control device is preferably a microprocessor.

At least one of the first sensors is positioned within a path of light passing through the at least one light window from the exterior.

At least one of the first sensors is arranged in a path of light emitted by the taillight and reflected at dirt particles on the at least one light window.

The luminosity of the lights may be controlled based on light emitted by headlights of a following vehicle that impinges on an interior rearview mirror of the motor vehicle.

Preferably, the interior rearview mirror comprises at least one second light-sensitive sensor for sending signals to the control device.

The at least one second sensor comprises at least one electric line connected to the control device.

The interior rearview mirror is an EC (electrochromic) mirror.

The luminosity at least of the brake light is preferably increased during braking.

During braking signals are sent to the analog/digital convertor.

The vehicle preferably has a bus system to which are connected a control of an anti-lock brake system, of an odometer generator, and of a brake pedal, respectively, wherein the control device is connected to the bus system. The bus system is preferably a CAN (controller area network) system.

Advantageously, the taillight fixture further comprises a clock monitoring device for sending timing signals to the lights.

The turn signal light is activated as an emergency flashing light when a maximum braking action is performed.

The motor vehicle has a bus system and various further sensors are connected to the control device of the taillight fixture via a SLIO (serial linked input/output) module and the bus system.

The vehicle has sensors connected to the SLIO module.

Messages of the control device or of vehicle-own devices connected to the bus system are displayed on a display device.

The bus system provides a scaling function for the entire system.

The bus system may also provide a reciprocal monitoring function.

In the inventive taillight fixture the first light-sensitive sensor or sensors provide that the luminosity of the lights enclosed in the taillight fixture can be changed depending on the exterior light conditions. For example, the exterior of the light window may be soiled so that light beams emitted by the lights within the taillight fixture are reflected at the soil particles onto the light-sensitive sensor(s). The sensor then sends signals to the control device which controls, in turn, the luminosity of the respectively switched-on, respectively, actuated light. Thus, when the light window is soiled, the luminosity is increased so that it is ensured that, despite the soiling of the light window, sufficient light can be emitted to the exterior. When, for example, due to intensive sunlight a lot of light impinges from the exterior onto the light window, the light-sensitive sensor provides that the luminosity of the respectively switched-on, respectively, actuated light is increased. This ensures that, even for great sunlight exposure of the light window, the respective light of the taillight fixture can be easily detected by following traffic participants.

In a preferred embodiment, the luminosity of the lights is controlled based on light emitted by headlights of a following vehicle that impinges on the interior rearview mirror of the respective motor vehicle driving in front in order to ensure that the following traffic participants are not blinded by the increased luminosity of the lights. The light emitted by the headlights of a following vehicle impinges on the interior rearview mirror of the motor vehicle in front thereof. At the interior rearview mirror or in its area at least one second sensor is provided onto which the light emitted by the headlight impinges and which sends corresponding signals to the control device. The control device reduces the luminosity of the switched-on light to such an extent that the driver of the following vehicles is not blinded. Other sensors can, of course, also be used in this controlling action. In another preferred embodiment, the luminosity of at least the brake light is increased during braking. Following traffic participants can then realize quickly that the vehicle in front of them is braking.

BRIEF DESCRIPTION OF THE DRAWINGS

The object and advantages of the present invention will appear more clearly from the following specification in conjunction with the accompanying drawings, in which:

FIG. 4 and

DESCRIPTION OF PREFERRED EMBODIMENTS

The present invention will now be described in detail with the aid of several specific embodiments utilizing FIGS. 1 through 7.

Figure 1:
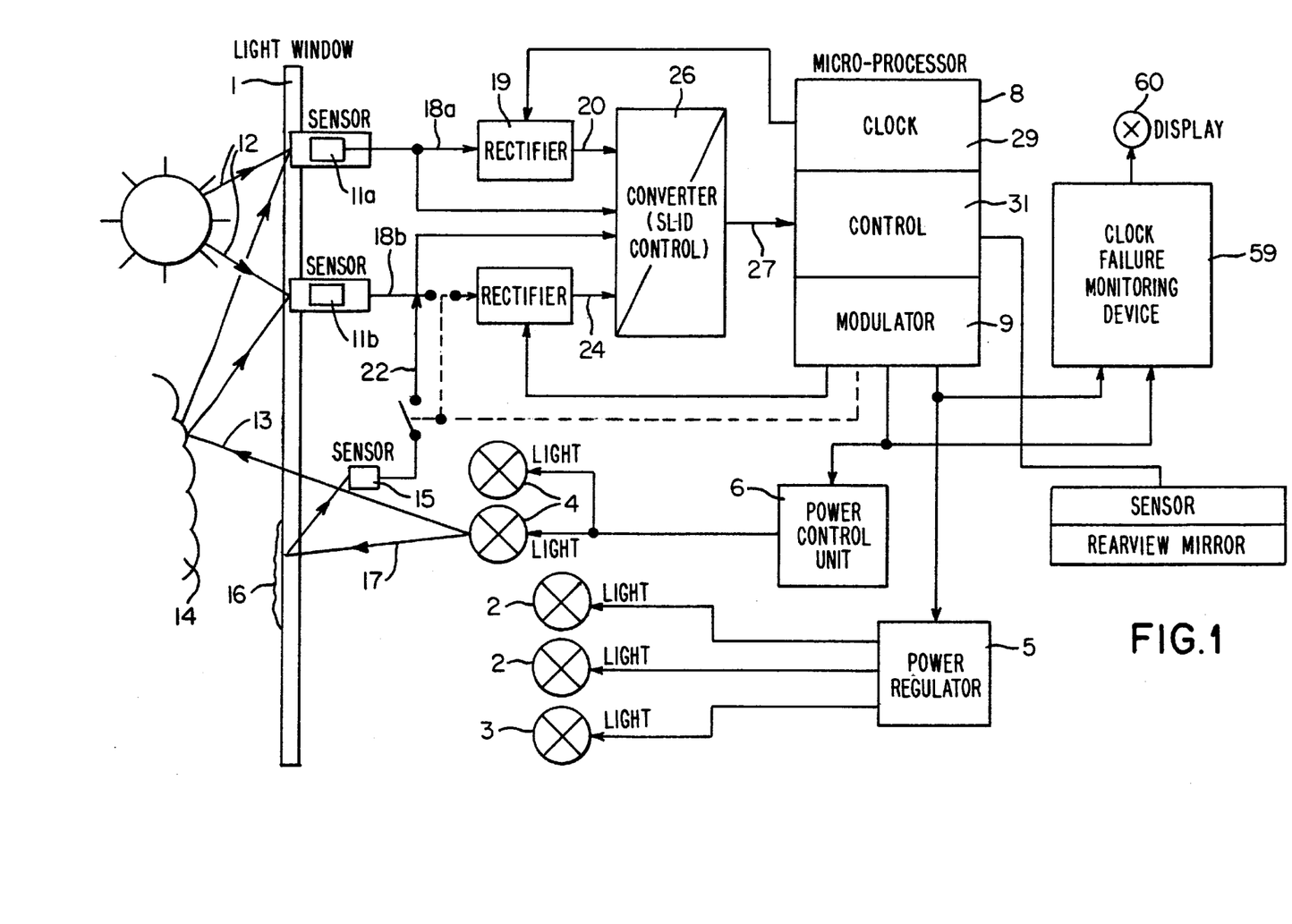
FIG. 1 is a block diagram of the inventive taillight fixture.

FIG. 1 shows a portion of a taillight fixture of a vehicle. The taillight fixture has a light window 1 behind which lights 2 through 4 are arranged. The light 2 is a brake light. The lights 3 and 4 represent two turn signal lights and two taillights.

The lights 2 through 4 in the shown embodiment are incandescent light bulbs, but can also be, for example, in the form of LEDs. The lights 2 through 4 are connected to the electrical supply net of the vehicle. The light window 1 is advantageously colored in the area of the individual lights 2 through 4 in the required color. The brake light 2 and the turn signal lights 3 are connected to the current regulator (power regulator) 5 that is connected to the electrical supply net. The current regulator 5 can, of course, also be of a two part construction. The taillights 4 are connected to a further power control unit (current regulator or power regulator) 6 that is also electrically connected to the electrical supply net.

Both power regulators 5, 6 are connected to the microprocessor 8 which sends, in a manner to be described in the following, signals to the power regulators 5, 6 in order to automatically adjust the luminosity of the respective lights 2 through 4 to the exterior lighting conditions.

Within the taillight fixture at least one sensor 11 is provided behind the light window 1 which is arranged such that light, such as sunlight 12, impinging on the taillight fixture from the exterior will impinge on the sensor 11. The sensor 11 also receives light beams 13 which are emitted by the taillights 4 and reflected, for example, at snow particles, fog particles, or rain spray particles 14. These light beams 13 are at least partly reflected on snow flakes, water droplets 14 etc. when driving in snowy conditions, in fog or in water spray when it rains hard. In the represented embodiment two sensors 11a, 11b are provided which are preferably arranged directly at the back side of the light window 1.

Behind the light window 1 a further sensor 15 is arranged at a distance to the light window 1 which functions as a sensor for detecting soiling. When the exterior of the light window 1 is covered with dirt 16, then at least a portion of the light emitted by the taillights 4 is reflected at the dirt layer 16 to the dirt sensor 15. This is represented schematically in FIG. 1 by arrow 17. With sensors 11a, 11b, 15, the lights 2 through 4 can thus be adjusted to different exterior light conditions such that even for a soiled light window 1 and/or intensive sun radiation and/or during driving in snow, in fog or in the spray of heavy rain, a sufficiently strong light is emitted through the light window 1 so that following traffic participants can reliably detect and timely see the vehicle in front of them.

The signal 18a generated by the sensor 11a is sent to a rectifier 19, preferably a synchronizing rectifier, which sends a correspondingly rectified signal 20 to an analog/digital convertor 26.

The signal 18b emitted by the sensor 11b is sent to the rectifier 23 which is advantageously also a synchronizing rectifier. The rectified signals 24 are then sent to the analog/digital convertor 26. The output 27 of the analog/digital convertor 26 is connected to the microprocessor 8 which processes the incoming signals.

The signal 22 emitted by the dirt sensor 15 is processed by the rectifier 23 arranged downstream which is preferably a synchronizing rectifier. The rectified signal 24 is also supplied to the analog/digital convertor 26. The output 27 of the analog/digital convertor 26 is connected to the microprocessor 8, and the incoming signals are processed within the microprocessor 8 in a manner which will be disclosed infra.

The two power regulators 5, 6 are connected to the electrical supply system of the vehicle which, when the running light switch is turned on, supplies the required electricity to the lights. The taillights 4 are timed by the power regulator 6 via a pulse width modulator 9 of the microprocessor 8. The pulse-pause ratio for the initial switching of the taillights 4 is controlled to a preadjusted minimal value. The thus modulated light 13, 17 emitted by the taillights 4 thus passes through the light window 1 to the exterior. In bad weather and bad visibility conditions such as snow, fog, or spray formation during heavy rain, the exiting light 13 is reflected at the snowflakes, the wall of fog or the spray (14) and scattered, as shown in FIG. 1. The light 17 can be reflected also by dirt 16 at the exterior of the light window 1.

A portion of the reflected light 13, 17 is detected by the sensors 11a, 11b, 15. The respective sensors 11a, 11b, 15 provide a modulated output signal 18a, 18b, 22 that corresponds to the intensity of the reflected light and which is filtered by the respective rectifier 19, 23. For demodulating this signal, the rectifier 19, 23 requires the correct timing that is provided by the timing generator (clock) 9, 29 of the microprocessor 8.

The values determined by the respective rectifiers 19, 23 are supplied to the analog/digital convertor 26 which converts the analog signals 18a, 18b, 22 into digital signals 27 which are supplied to the microprocessor 8. The microprocessor 8 determines based on the input signals the corresponding pulse/pause times for the pulse width modulator member PWMI and PWMII. The new pulse/pause times have the effect that the luminosity of the lights is adjusted with the power regulators 5, 6 to the respective exterior lighting conditions. In the described case, the luminosity is increased so that despite falling snow, fog, spray 14 etc. the vehicle can be reliably detected and timely seen by the following traffic participants.

As soon as the exterior light conditions improve, for example, when the vehicle leaves a foggy area 14, or the dirt 16 at the light window 1 has been removed, the light beams 13, 17 emitted by the taillights 4 are reflected no longer or only to a minimal extent onto the sensors 11a, 11b, 15. With the aid of the disclosed circuit the pulse/pause times are correspondingly changed and the luminosity of the lights is thus reduced.

In the disclosed manner an automatic adjustment of the luminosity of the lights 4 to the exterior light conditions is ensured.

FIG. 1 shows the scenario in which strong sun radiation 12 acts onto the light window 1. In this case, an automatic adjustment of the luminosity is also performed. The sun, respectively, the sun radiation 12 itself serves as a signal source, while in the aforedescribed case the controlled lights 4 served as a signal source.

The sensors 11a, 11b supply a modulated output signal 18a, 18b, corresponding to the intensity of the sun radiation 12, that is supplied via rectifiers 19, 23 and the analog/digital convertor 26 to the microprocessor 8. The microprocessor 8 processes the signals to determine the pulse/pause times for the pulse width modulation member PWMI, respectively, PWMII. The new pulse/pause times are used to increase the luminosity of the lights. This ensures that, even for strong sun radiation, the vehicle can be reliably detected by following traffic participants.

It is possible to provide at the exterior side of the vehicle a washing device which is automatically activated when a certain degree of soiling of the exterior of the light window 1 is detected. Such a washing device is connected to the microprocessor 8 and is supplied with corresponding signals when the signals emitted by the soil sensor 15 indicate a corresponding degree of soiling of the light window 1.

When driving in snow, in fog, in heavy spray or even for great soiling of the light window 1, it is possible to control the brake light 2 and the turn signal light 3 via the power regulator 5 in order to increase their respective luminosity when the exterior visibility conditions are bad.

In the disclosed manner, aging of the lights 2 through 4 can also be detected. When the luminosity is reduced because of aging of the lights, this is detected by the respective sensors 11a, 11b, 15. They emit, in the manner described above, a respective signal to the microprocessor 8 which controls the respective light such that it reaches the original or at least an increased luminosity.

An interior rearview mirror provided within the motor vehicle and embodied as an EC mirror can be connected to the control 31 of the microprocessor 8. When light emitted by the headlights of a following vehicle impinge on the EC mirror and when the lights 2 through 4, in the manner disclosed above, are currently operated with increased luminosity, the control 31 of the microprocessor 8 will receive a signal from the EC mirror. The lights 2 through 4 are thus controlled in the disclosed manner and their light intensity (luminosity) is reduced. Thus it is avoided that the following vehicles are blinded by lights 2 through 4 that have a too great light intensity.

When light emitted by a headlight no longer impinges on the EC mirror, the lights 2 through 4 are controlled by the microprocessor 8 such that they will resume their initial luminosity.

It is also possible to increase independent of sunlight, fog, spray, soiling etc. the luminosity of the braking light 2 during braking. The following traffic participant can then detect in a timely fashion that the vehicle in front of him is braking.

An anti-lock braking system, an odometer generator, a brake pedal etc. of the vehicle can be connected with at least one electrical lead to the analog/digital convertor 26. When the brake is actuated, respective signals are sent via this line and the analog/digital convertor 26 to the microprocessor 8. In the disclosed manner, with a change of the pulse/pause time the luminosity of the braking light is increased. This control of the brake light 2 can also be performed when the luminosity due to the aforementioned outer conditions has already been increased.

It is also advantageous when the luminosity of the brake light 2 is increased only when the vehicle is braked at a maximum power. For an antilock braking system or an odometer generator the braking deceleration can be simply detected and can be supplied in signal form to the control device 8. The luminosity increase in this case takes place only when a preset braking deceleration is surpassed.

In the disclosed embodiment, as well as within the following embodiments, the lights cannot only be in the form of incandescent light bulbs and LEDs, but also, for example, in the form of fluorescent lights or PCP (printed circuit board) incandescent lights etc. The disclosed sensing arrangement and the sensing arrangement still to be disclosed in the following can be a constructive component of the taillight fixture. However, it is also possible to integrate the sensing arrangement as an independent module into the taillight fixture.

The microprocessor 8 has arranged downstream thereof a clock failure monitoring device 59 which is supplied by the microprocessor 8 with the signals also supplied to the current regulators 5, 6. With this device 59 the proper function of the system as well as of the lights 2 through 4 can be monitored. When an error occurs, an optical display 60 is, for example, activated. Instead of the optical display 60 it is also possible to employ an acoustic and/or visual signal. With the clock failure monitoring device 59 the absence of a changing signals is detected. Any suitable component can be used which is able to produce, upon occurrence of a level change of the signal to be monitored having the period $t_{cycle}$ a processible impulse of greater duration than the period $t_{cycle}$. In the represented embodiment (FIG. 3 and 3a) the components are two multivibrators MV1 and MV2.

The function of the taillight fixture depends directly on the modulation of the light emitted by the lights 2 through 4 and the control of the respective rectifier 19, 23 with the corresponding timing signal (clock signal). The timing signal is generated by the microprocessor 8 and is supplied to the driver outputs, respectively, current regulators 5, 6 of the lights 2 through 4 as well as to the rectifiers 19, 23. When this timing signal is absent, this is a sign that the system has lost control over the lights 2 through 4.

Figure 3:
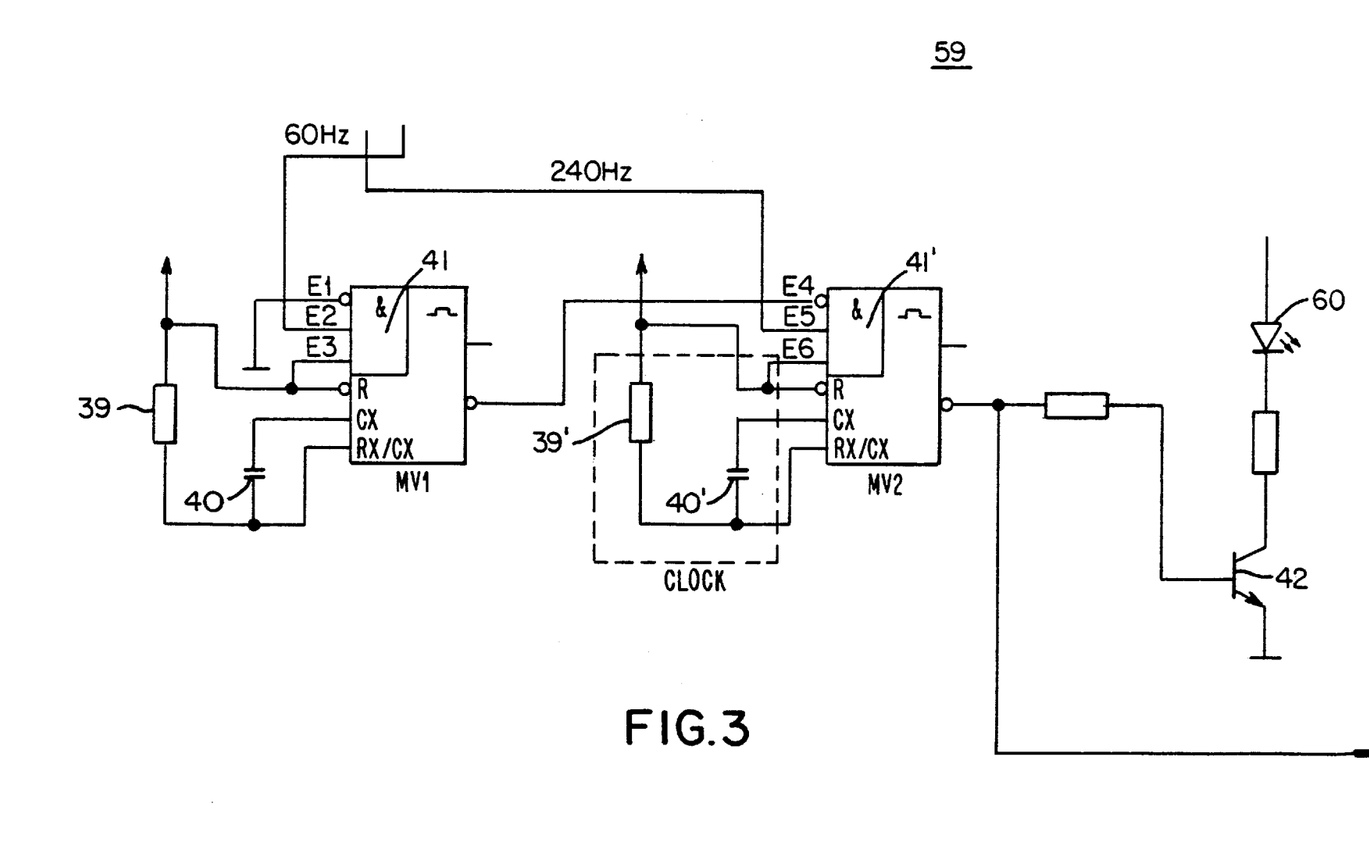
FIG. 3 shows the current diagram of a clock monitoring device.
Figure 3A:
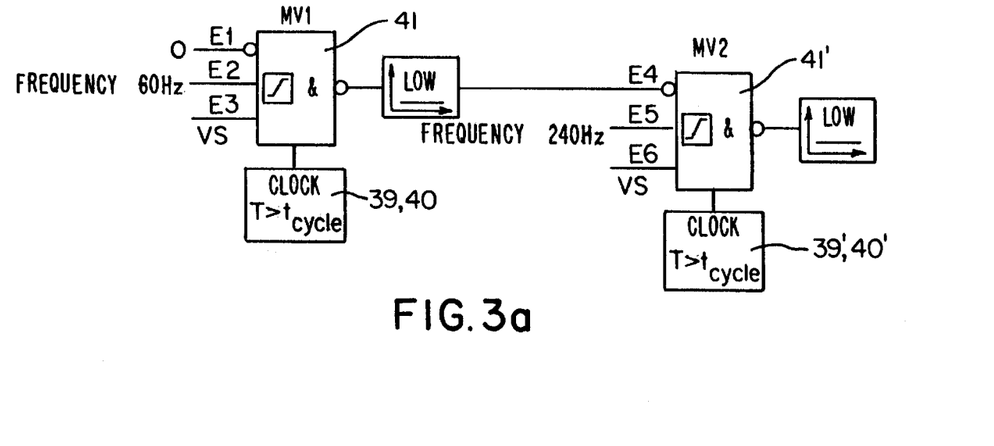
FIG. 3a shows the principle and the signals of the clock monitoring device according to FIG. 3 for an error-free monitored signal.

The timing signal is in the form of a rectangular signals whereby the frequency for the taillight 4 is 60 Hz and for the turn signal light 3 and the brake light 2 is 240 Hz. The two multivibrators MV1, MV2 are switched externally with a respective resistor 39, 39' and a capacitor 40, 40'.

The signal to be monitored (cycle time 60 Hz) is supplied to the multivibrator MV1 to an AND (&) member 41 with three inputs E1, E2, E3 via a non-inverting input E2. At the same time, the inverting input E1 is connected to ground (0) and a non-inverting input E3 is connected to the voltage supply VS (FIG. 3a). When an upward flange of the timing signal is detected at the input E2 of the AND member 41, the multivibrator MV1 is activated to release at its output a rectangular impulse with low level. At the output of the multivibrator MV1 the otherwise high voltage level is thus lowered for a certain amount of time to a low level. The time period of the emitted rectangular impulse of the multivibrator MV1 must be at least of the same length as a cycling period $T_{cycle}$ of the signal to be monitored in order to ensure a failure-free functioning of the cycling error detection.

The output signal of the multivibrator MV1 (low) is supplied to the inverting input E4 of an AND (&) member 41' of the multivibrator MV2. The second signal to be monitored (cycle time 240 Hz) is supplied here to the non-inverting input E5 of the multivibrator MV2. The non-inverting input E6 is supplied with the level of the voltage supply VS. The pulse width constant used in the disclosed circuit as an output signal of both multivibrators MV1, MV2 is determined by a cycling member, comprised of the capacitors 40, 40' and the resistors 39, 39', and is longer than the period $t_{cycle}$ of the 60 Hz cycle time. This ensures that for the multivibrator MV2 at the input E4 of the AND member 41' always a low level is provided which corresponds to ground. At the input E5 of the multivibrator MV2 an upwardly inclined flange (240 Hz) is provided with sufficiently short spacing which causes the AND member 41' to generate at the output of the multivibrator MV2 a low signal with the same period length that is present at the output of the multivibrator MV1. The output of the multivibrator MV2 is the error signal output. With the disclosed method it is ensured that at the output of the multivibrator MV2 there is always a low signal present as long as at least one of the changing signals to be monitored is not absent for a time period longer than the selected pulse width constant. When one of the two timing signals is absent, at the output of the multivibrator MV2 an error signal is permanently emitted in the form of a high signal. With this signal, for example, a transistor 42 can be controlled which switches on the display 60 which is for example, an LED. Thus, it is possible to reliably and simply detect an error and to correct this error in a timely fashion.

The microprocessor 8 serves as a timing generator and as a control of the lights; it includes the pulse width modulator members 9.

Figure 2:
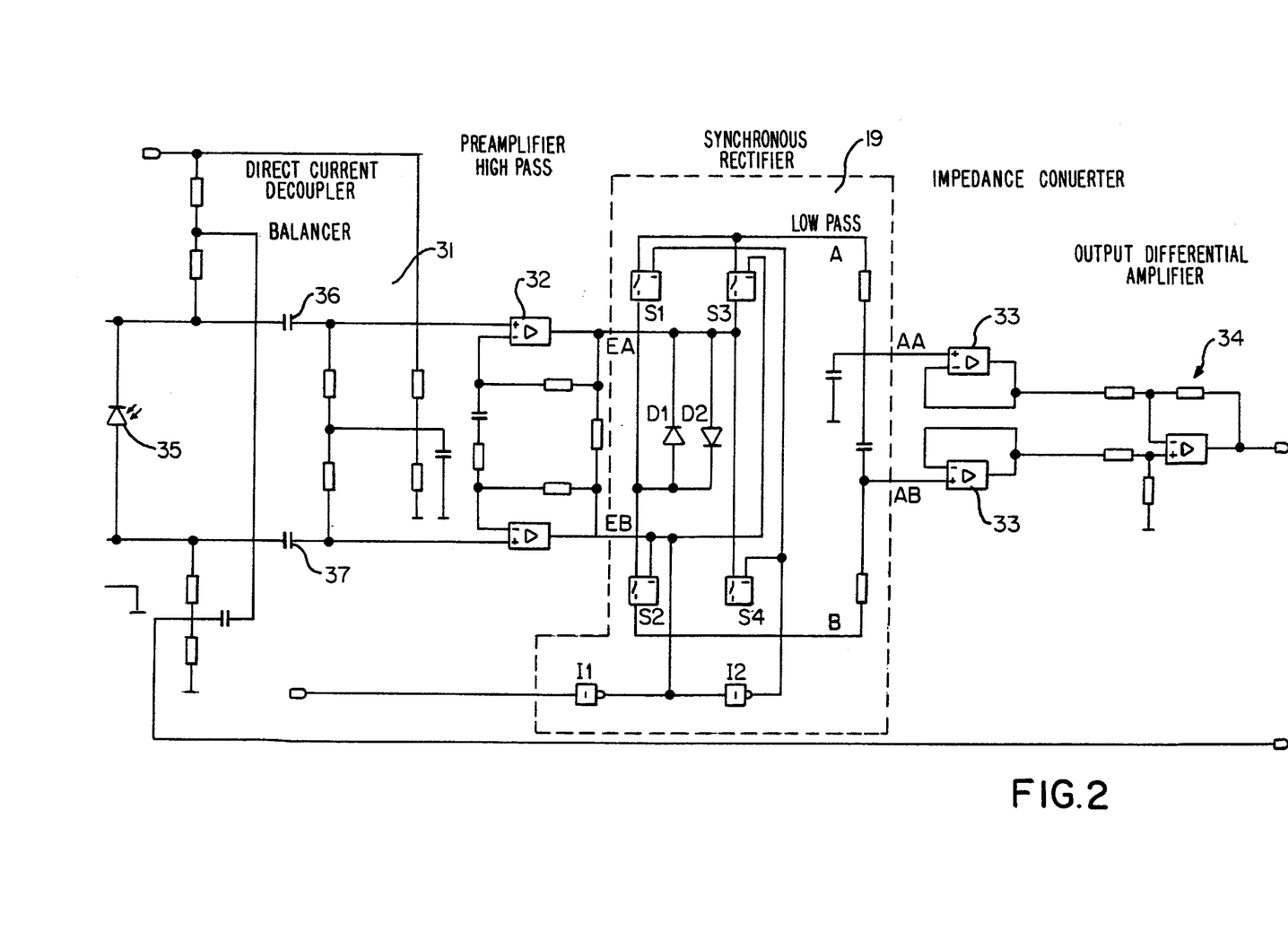
FIG. 2 is a circuit diagram of a portion of the taillight fixture according to FIG. 1.
Figure 2A:
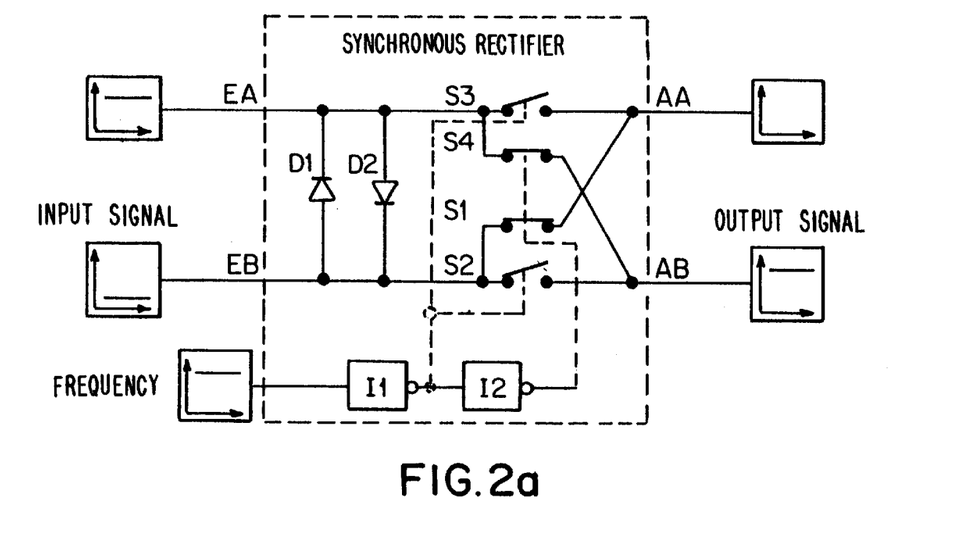
FIG. 2a shows the switching state of a synchronizing rectifier of the inventive taillight fixture when a high timing signal is present.
Figure 6A:
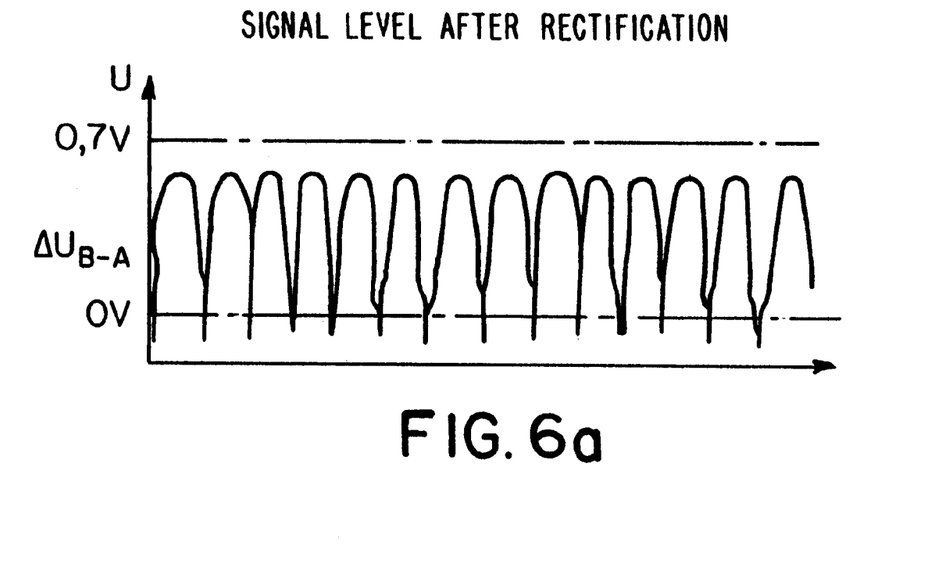
FIG. 6a shows a voltage/time diagram of the signal level of the synchronizing rectifier after rectification.
Figure 6B:
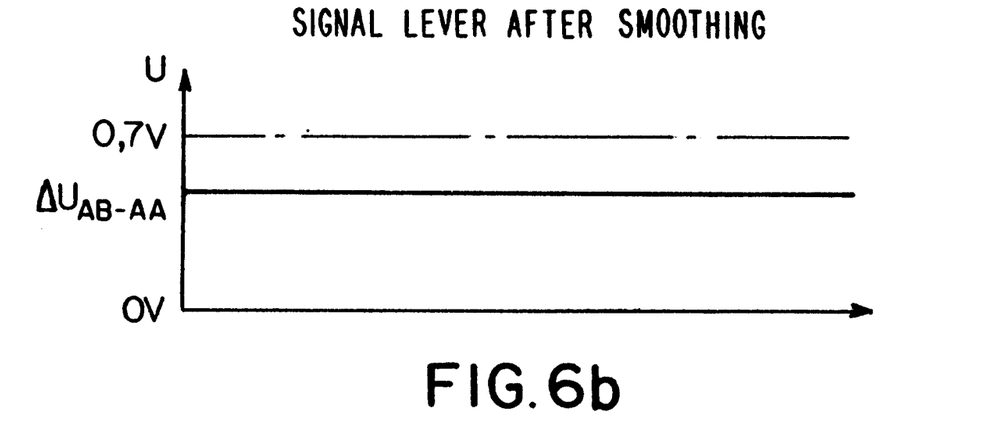
FIG. 6b shows the voltage/time diagram of the signal level of the synchronizing rectifier after smoothing.

With the aid of FIG. 2 the embodiment and function of the synchronizing rectifier 19 will be explained in detail. With the synchronizing rectifier 19 the amplitude of the input changing signal is to be processed with the analog/digital convertor for further digital processing. For this purpose, the convertor is provided with a dc signal proportional to the amplitude of the input changing signal. The synchronizing rectifier 19 is comprised substantially of four switches, and the synchronizing rectifier 23 is substantially of the same construction. A logic circuit provides a synchronized timing signal that has the same state as the signal at the input EA of the rectifier. The switches are actuated such that at the output of the synchronizing rectifier 19 dc current is always present (FIG. 6b).

The synchronizing rectifier 19 in the shown embodiment comprises two diodes D1, D2, an hex inverter I1, I2 and a four-way switch-IC comprised of the switches S1 to S4. The diodes D1, D2, the inverters I1 and I2, and the switches S1, S2, respectively, S3, S4 are switched parallel to one another. The rectifier 19 has two inputs EA and EB to which are supplied via the direct current decoupler 31 signals processed by a balancer and a preamplifier 32, in the form of a high pass.

Outputs AA and AB of the rectifier 19 have connected thereto downstream two impedance convertors 33 as well as an output differential amplifier 34.

Figure 4:
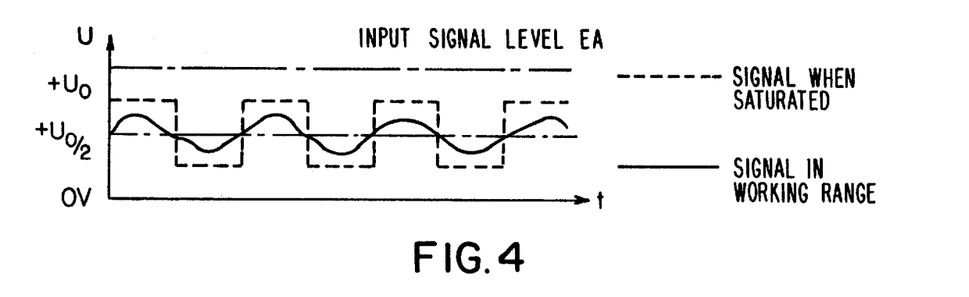
Figure 5:
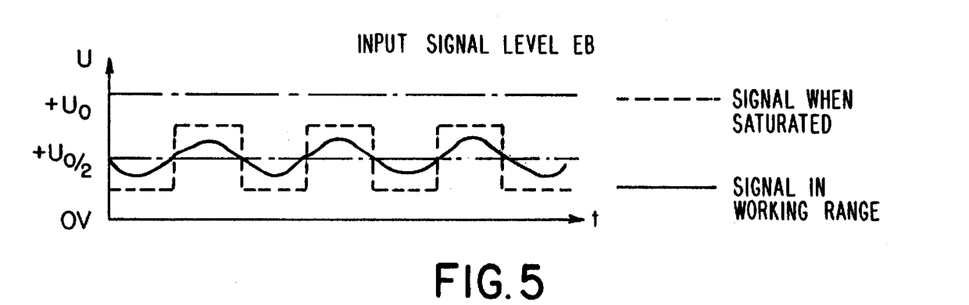
FIG. 5 show a respective voltage/time diagram of the input signal level at the two inputs of the synchronizing rectifier.

At the outputs EA, EB of the rectifier 19 a voltage input signal is present that is symmetrical between 0 volt (GND) and the supply voltage $+U_o$ (FIGS. 4 and 5). Synchronously to the voltage input signals, the switches S1 through S4 receive the cycling signal as switching currents which are processed by the inverters I1, I2. As shown in FIGS. 4 and 5, the input signal can be either one of the two levels: "timing cycle high" and "timing cycle low". FIG. 4 shows the input signal level at the input EA and FIG. 5 shows the input signal level at the input EB of the rectifier 19. The signal in the working range is shown in solid lines and the signal in saturated condition is represented in dashed lines.

The following description is divided according to the input signals to be rectified and the corresponding timing cycle into the phases "timing cycle high" and "timing cycle low". When the timing signal has the "state" high, the light emitted by the lights 2 through 4 is impinging on the PIN diode 35 (FIG. 2) in the reflection and scattering scenario. Thus, the diode 25 becomes conducting. The high voltage level at the cathode is lowered (low). The identical portion (daylight) is decoupled and inverted by the decoupling capacitors 36, 37. The changing signal is placed symmetrically to the half of the supply voltage $U_o/2$. At the input EA of the rectifier 19 a relatively high voltage is thus present (high). At the input EB of the rectifier 19 a relatively low voltage level is present (low). Simultaneously, the invertor I1 is in the same state as the signal to be rectified at the input EA (high) because of the supplied timing signal. The output of the invertor I1 (low) is connected to the switches S2 and S3 which remain open. Via the output of the second invertor I2 (high) the switches S1 and S4 are closed. In this phase, the high signal present at the input EA of the rectifier 19 is supplied via the switch S4 to the output AB of the rectifier 19. The low signal of the input EB is supplied via the switch S1 onto the output AA of the rectifier 19. The diode D2 effects a limitation of the differential voltage between the two inputs EA and EB of the rectifier 19 to 0.7 volt in the shown embodiment. This corresponds to a respective voltage drop at the diode.

Figure 2B:
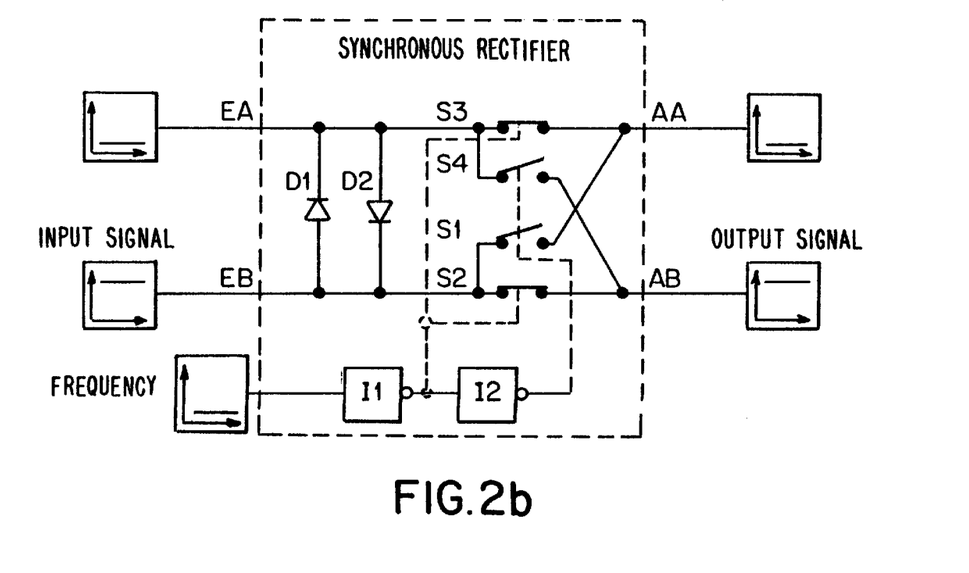
FIG. 2b shows the switching state of a synchronizing rectifier of the inventive taillight fixture when a low timing signal is present.

When the PIN diode 35 is less illuminated, the reduced conductive capability increases relatively the voltage at the cathode in comparison to the previously disclosed phase. At the input EA of the rectifier 19 a low level is present due to the inverted properties resulting from the direct current decoupling (31). Correspondingly, at the input EB of the rectifier 19 a relatively high voltage level is present (high) in comparison to the previously disclosed phase (FIG. 2b).

By supplying the invertor I1 with low voltage level, a high voltage is present at its output. The two switches S2 and S3 are closed. The invertor I2 actuates opening of the switches S1 and S4. Via the switches S2 the high level is transmitted from the input EB to the output AB of the rectifier 19. Via the switch S3 the low signal of the input EA is transmitted to the output AA of the rectifier 19. The diode D1 ensures a limitation of the differential signal between the two outputs M and AB to approximately 0.7 volt, which corresponds to a corresponding voltage drop at the diode.

Due to this switching arrangement a lower voltage level is always present at the output AA of the rectifier 19 than at its output AB (FIG. 6B). The voltage difference between the two outputs AB and AA ($\Delta U_{AB-AA}$) is proportional to the amplitude of the rectangular input signal (FIG. 4 and 5) between the inputs EA and EB of the rectifier 19, as long as the voltage differential is not limited by the diodes D1 and D2.

Figure 7:
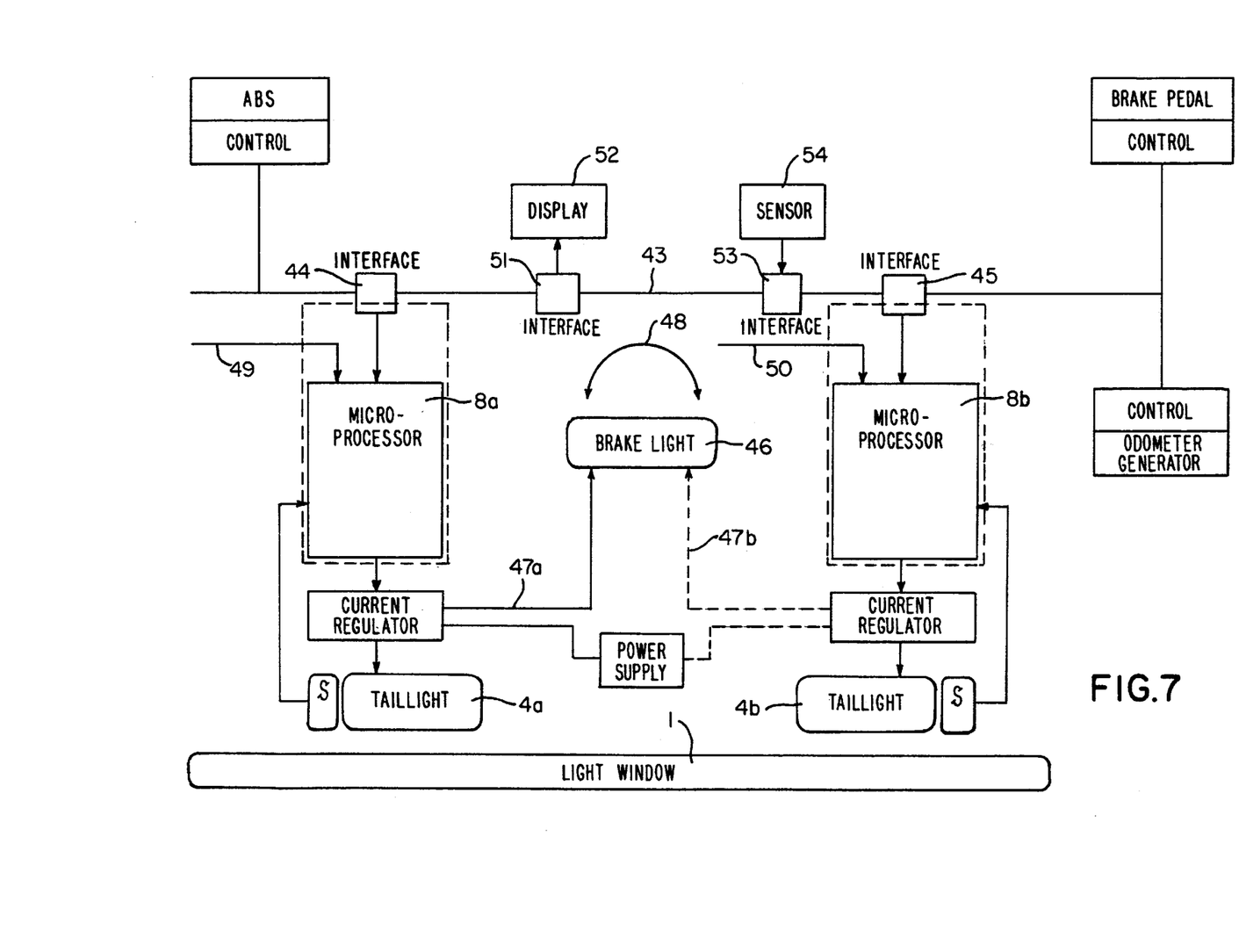
FIG. 7 shows in a schematic representation a second embodiment of the inventive taillight fixture.

FIG. 7 shows in a schematic representation the possibility of combining the sensor-technological functions, respectively, the corresponding actions via a bus system 43. The bus system is preferably a CAN bus that allows for a reliable processing of the signals. Two microprocessors 8a, 8b are connected to the bus system 43 via corresponding interfaces 44, 45 for controlling a left taillight 4a and a right taillight 4b in respect to their luminosity. The taillights 4a, 4b have coordinated therewith at least one sensor S via which the luminosity of the lights 4a, 4b is controlled in the aforedescribed manner as a function of the outer visibility and/or as a function of the soiling of the light window 1. The sensors S are connected to the corresponding microprocessors 8a, 8b and transmit their signals in the aforedisclosed manner thereto. The microprocessors 8a, 8b process these signals in the disclosed manner. Via the current regulators 5a, 5b, the taillights 4a, 4b are controlled in regard to their luminosity.

The vehicle has a brake light 46 at a high location at the vehicle and comprises preferably LEDs as a light source. This brake light 46 positioned at a high location is controlled by one of the two microprocessors 8a or 8b. The corresponding control signals are supplied to the brake light 46 by an electric line 47a or 47b of the respective amplifier 5a or 5b.

The two microprocessors 8a, 8b are positioned within a control circuit in which also the correspondingly controlled lights are arranged. The two control circuits are coupled to one another by a monitoring circuit 48. It compares the two control circuits with one another in order to determine in this manner, for example, different soiling of the light windows 1. When the two light windows 1 of the vehicle are soiled to different extents, the lights positioned therebehind must be controlled differently with respect to their luminosity.

The two microprocessors 8a, 8b can be supplied via electric lines 49, 50 in a conventional manner with control signals, for example, signals which relate to the different lights 2 through 4, 4a, 4b.

The lines of the bus system 43 can be comprised of wire, but preferably they are in the form of light guides.

As is shown in an exemplary fashion in FIG. 7, a display 52 may be connected via an interface 51 to the bus system 43 and via an interface 53 other sensors 54 can also be connected thereto. Via the interface 53 it is thus possible to transmit signals, for example, of an anti-lock braking system (ABS), of an odometer generator, a braking pedal etc. For example, when braking of the vehicle occurs, via the interfaces 53, 44, 45 corresponding signals are supplied to the respective microprocessor 8a, 8b. As has been explained above, by changing the pulse/pause time periods, the luminosity of the brake light can be increased. This control of the brake light can also be performed when the brightness has already been increased because of the exterior light conditions.

Advantageously, the luminosity of the brake light 2, 46 is increased only when the vehicle is strongly braked. When an anti-lock system or a odometer generator is present, the braking deceleration can be simply determined and can be supplied in signal form to the respective microprocessor 8a, 8b. The luminosity increase in this case only occurs when a preset braking deceleration is surpassed. Alternatively, an emergency flashing function of the turn signals can be activated.

By processing data of the sensor modules, respectively, by combining with other sensors on board of the vehicle, it is possible to activate individual functions of the taillight fixture. It is possible, to provide a single as well as a double or multiple embodiment of the sensor-technological functions, respectively, the corresponding action. Via the bus system 43 it is possible to provide, corresponding to the scaling of the system, redundance which in a corresponding embodiment allows for a fail-safe function. The scaling of the system is provided in that for each vehicle different characteristic lines within the microprocessor 8, 8a, 8b will be memorized. It is possible, as a function of the different countries in which the taillight fixture is to be sold, to provide different characteristic lines within the microprocessor in order to take into consideration specific legal regulations of these different countries.

When a multiple embodiment according to FIG. 7 is used, differences of the individual taillights, respectively, of its lights can be individually controlled. For example, the light windows of the two taillight fixtures of a vehicle can have different degrees of soiling so that a different control of the corresponding lights is required.

When a light is replaced it has in general a different luminosity than a light that has been in use for a while. In the multiple embodiment, as represented, for example, in FIG. 7, the new light can be controlled separately and can be adapted to the luminosity of the other lights in the taillight fixture.

When system errors are detected, respectively, a failure of partial functions occurs, the disclosed fail-safe function, for example, an emergency program can be activated, and additionally a suitable driver information can be provided.

With the current control elements in form of the power regulators 5, 6, a continuous level adjustment is possible so that at the lights 2 through 4, 4a, 4b, 46 a constant current supply for maintaining a respective luminosity is ensured. Furthermore, a so-called two level switching with any desired number of intermediate steps is possible. With a two level switching operation, it is ensured that the lights will have a greater luminosity during the day than at night.

The present invention is, of course, in no way restricted to the specific disclosure of the specification and drawings, but also encompasses any modifications within the scope of the appended claims.

What we claim is:

1. A taillight fixture for a motor vehicle, said taillight fixture comprising:
   at least one light window;
   a light arrangement with lights including a brake light, a turn signal light, and a taillight arranged behind said at least one light window so that light beams emitted by said light arrangement pass through said at least one light window to the exterior;

one or more first light-sensitive sensors positioned in the area of said at least one light window;

a control device;

said one or more first sensors connected to said control device;

at least one of said lights of said light arrangement connected to said control device, wherein said control device controls a luminosity of said at least one light based on signals received from said one or more first sensors;

wherein said control device processes the signals received from said one or more first sensor to modulated control signals provided at the output of said control device for controlling the luminosity;

wherein at least one of said one or more first sensors is positioned directly within a path of light passing through said at least one light window from the exterior, wherein said at least one first sensor provides a sunlight-modulated signal to said control device and wherein luminosity of said at least one light is increased with increasing sunlight intensity.

2. A taillight fixture according to claim 1, wherein said one or more first sensors are positioned behind said at least one light window.

3. A taillight fixture according to claim 1, wherein said one or more first sensors are a part of said at least one light window.

4. A taillight fixture according to claim 1, further comprising an analog/digital converter, wherein said one or more first sensors are connected to said analog/digital converter.

5. A taillight fixture according to claim 4, wherein said analog/digital converter is an SLIO (serial linked input/output) controller.

6. A taillight fixture according to claim 4, wherein said analog/digital converter is connected to said control device.

7. A taillight fixture according to claim 4, further comprising a rectifier connected to said one or more first sensors and said analog/digital converter.

8. A taillight fixture according to claim 7, wherein said rectifier is a synchronizing rectifier.

9. A taillight fixture according to claim 4, wherein the luminosity at least of said brake light is increased during braking when a preset deceleration value is surpassed.

10. A taillight fixture according to claim 9, wherein during braking signals are sent to said analog/digital converter.

11. A taillight fixture according to claim 10, wherein the vehicle has a bus system to which are connected a control of an anti-lock brake system, of an odometer generator, and of a brake pedal, respectively, wherein said control device is connected to the bus system.

12. A taillight fixture according to claim 11, wherein the bus system is a CAN (controller area network) system.

13. A taillight fixture according to claim 1, wherein said control device is a microprocessor.

14. A taillight fixture according to claim 1, wherein at least one of said one or more first sensors is arranged in a path of light emitted by said taillight and reflected at dirt particles on said at least one light window.

15. A taillight fixture according to claim 1, wherein the luminosity of said lights is controlled based on light emitted by head lights of a following vehicle that impinges on an interior rearview mirror of the motor vehicle.

16. A taillight fixture according to claim 15, wherein the interior rearview mirror comprises at least one second light-sensitive sensor for sending signals to said control device.

17. A taillight fixture according to claim 16, wherein said at least one second sensor comprises at least one electric line connected to said control device.

18. A taillight fixture according to claim 15, wherein the interior rearview mirror is an EC (electrochromic) mirror.

19. A taillight fixture according to claim 1, further comprising a clock monitoring device for sending timing signals to said lights.

20. A taillight fixture according to claim 1, wherein said turn signal light is activated as an emergency flashing light when a maximum braking action is performed.

21. A taillight fixture according to claim 1, wherein the motor vehicle has a bus system and wherein various further sensors are connected to said control device via a SLIO module and the bus system.

22. A taillight fixture according to claim 21, wherein the vehicle has sensors connected to said SLIO (serial linked input/output) module.

23. A taillight fixture according to claim 21, wherein messages of said control device or of vehicle-own devices connected to the bus system are displayed on a display device.

24. A taillight fixture according to claim 21, wherein the bus system provides a scaling function for the entire system.

25. A taillight fixture according to claim 21, wherein said bus system provides a reciprocal monitoring function, wherein said control device comprises a first microprocessor and a second microprocessor, connected by interfaces to said bus system, for controlling a left taillight and a right taillight, respectively, each one of said taillights having at least one of said sensors, wherein said lights are controlled via said sensors, based on external light conditions or soiling of said light windows or both.

26. A taillight fixture according to claim 25, wherein each one of said microprocessors is connected within a separate control circuit and wherein said separate control circuits are coupled by said reciprocal monitoring function.

27. A taillight fixture for a motor vehicle, said taillight fixture comprising:

at least one light window;

a light arrangement with lights including a brake light, a turn signal light, and a taillight arranged behind said at least one light window so that light beams emitted by said light arrangement pass through said at least one light window to the exterior;

one or more first light-sensitive sensors positioned in the area of said at least one light window;

a control device;

said one or more first sensors connected to said control device;

at least one of said lights of said light arrangement connected to said control device, wherein said control device controls a luminosity of said at least one light based on signals received from said at least one first sensor;

at least one current regulator connected between said control unit and said at least one light and connected to a power supply of the motor vehicle for processing the signals of said one or more first sensors to current-controlled signals;

wherein at least one of said one or more first sensors is positioned directly within a path of light passing through said at least one light window from the exterior, wherein said at least one first sensor provides a sunlight-modulated signal to said control device and wherein luminosity of said at least one light is increased with increasing sunlight intensity.

* * * * *

UNITED STATES PATENT AND TRADEMARK OFFICE
CERTIFICATE OF CORRECTION

PATENT NO.    : 5,952,917
DATED         : September 14, 1999
INVENTOR(S)   : Werner Zimmermann, et. al.

It is certified that error appears in the above-identified patent and that said Letters Patent is hereby corrected as shown below:

Title page, item [54] and col. col. 1, line 1, in the title should read--
TAILLIGHT FIXTURE OF A VEHICLE, PREFERABLY A MOTOR VEHICLE--.

Signed and Sealed this

Seventh Day of March, 2000

Q. TODD DICKINSON

*Attest:*

*Attesting Officer*            *Commissioner of Patents and Trademarks*